United States Patent
Mather et al.

(10) Patent No.: US 10,875,282 B2
(45) Date of Patent: Dec. 29, 2020

(54) SHAPE MEMORY ASSISTED SELF-HEALING POLYMERS HAVING LOAD BEARING STRUCTURE

(71) Applicants: Patrick T. Mather, Oxford, PA (US); Wenyang Pan, Syracuse, NY (US)

(72) Inventors: Patrick T. Mather, Oxford, PA (US); Wenyang Pan, Syracuse, NY (US)

(73) Assignee: Syracuse University, Syracuse, NY (US)

( * ) Notice: Subject to any disclaimer, the term of this patent is extended or adjusted under 35 U.S.C. 154(b) by 651 days.

(21) Appl. No.: 14/761,169

(22) PCT Filed: Jan. 15, 2014

(86) PCT No.: PCT/US2014/011618
§ 371 (c)(1),
(2) Date: Jul. 15, 2015

(87) PCT Pub. No.: WO2014/113432
PCT Pub. Date: Jul. 24, 2014

(65) Prior Publication Data
US 2015/0343749 A1    Dec. 3, 2015

Related U.S. Application Data (60) Provisional application No. 61/752,727, filed on Jan. 15, 2013.

(51) Int. Cl.
*B32B 27/08* (2006.01)
*C08L 25/06* (2006.01)
(Continued)

(52) U.S. Cl.
CPC ............ *B32B 27/08* (2013.01); *B32B 27/286* (2013.01); *B32B 27/302* (2013.01);
(Continued)

(58) Field of Classification Search
CPC ............ B32B 2250/24; B32B 2250/42; B32B 2270/00; B32B 2305/72; B32B 2307/54;
(Continued)

(56) References Cited

U.S. PATENT DOCUMENTS

| 2004/0122184 A1 | 6/2004 | Mather et al. |
| 2007/0087198 A1* | 4/2007 | Dry .................. B29C 73/22 428/408 |

(Continued)

OTHER PUBLICATIONS

Rieger (The Glass Transition Temperature of Polystyrene, J. Thermal Analysis, vol. 46, 1996, 965-972).*

(Continued)

*Primary Examiner* — Alicia J Sawdon
(74) *Attorney, Agent, or Firm* — Bond Schoeneck & King, PLLC; David Nocilly; George McGuire (57) ABSTRACT

A structural shape memory assisted self-healing polymer formed by laminating thin layers of an ionomer, such as a member of the poly(styrene sulfonate) (PSS) family of ionomers, with a WEGP-type SMP, such as atactic poly (styrene) (PS) with molecular weight in the 200 kDa range (or alternatively poly(methyl methacrylate) (PMMA)) in combination with polycyclooctene (PCO). The self-healing polymer may also comprise an interpenetrating, immiscible polymer network (IPN) based on a blend of polystyrene and polystyrene sulfonate (PSS).

3 Claims, 11 Drawing Sheets

(51) Int. Cl.
*C08L 25/10* (2006.01)
*C08L 45/00* (2006.01)
*C08L 33/08* (2006.01)
*B32B 37/10* (2006.01)
*B32B 37/06* (2006.01)
*B32B 27/28* (2006.01)
*B32B 27/30* (2006.01)
*B32B 27/40* (2006.01)

(52) U.S. Cl.
CPC .......... *B32B 27/304* (2013.01); *B32B 27/306* (2013.01); *B32B 27/308* (2013.01); *B32B 27/40* (2013.01); *B32B 37/06* (2013.01); *B32B 37/10* (2013.01); *C08L 25/06* (2013.01); *C08L 25/10* (2013.01); *C08L 33/08* (2013.01); *C08L 45/00* (2013.01); *B32B 2250/24* (2013.01); *B32B 2250/42* (2013.01); *B32B 2270/00* (2013.01); *B32B 2305/72* (2013.01); *B32B 2307/54* (2013.01); *B32B 2307/702* (2013.01); *B32B 2307/704* (2013.01); *B32B 2307/732* (2013.01); *B32B 2307/762* (2013.01); *B32B 2457/00* (2013.01); *Y10T 428/24942* (2015.01)

(58) Field of Classification Search
CPC ........ B32B 2307/702; B32B 2307/704; B32B 2307/732; B32B 2457/00; B32B 27/08; B32B 27/286; B32B 37/06; B32B 37/10; B32B 2307/762; C08L 25/06; B29C 73/20; B29C 73/16
See application file for complete search history.

(56) References Cited

U.S. PATENT DOCUMENTS

| | | | |
|---|---|---|---|
| 2009/0191402 A1* | 7/2009 | Beiermann | B29C 73/22 428/323 |
| 2011/0003137 A1* | 1/2011 | Cosentino | B32B 5/14 428/321.5 |
| 2011/0003159 A1* | 1/2011 | Mather | B32B 7/02 428/425.6 |
| 2011/0156310 A1 | 6/2011 | Rule et al. | |

OTHER PUBLICATIONS

International Search Report Form PCT/ISA/220, International Application No. PCT/US2014/011618, pp. 1-12, dated May 26, 2014.

* cited by examiner

SHAPE MEMORY ASSISTED SELF-HEALING POLYMERS HAVING LOAD BEARING STRUCTURE

CROSS-REFERENCE TO RELATED APPLICATIONS

The present application claims priority to U.S. Provisional Application No. 61/752,727, filed on Jan. 15, 2013.

BACKGROUND OF THE INVENTION

1. Field of the Invention

The present invention relates to self-healing polymers and, more particularly, to a shape memory assisted self-healing polymer that is fully thermoplastic and has structural stability.

2. Description of the Related Art

Shape memory materials are those materials that have the ability to "memorize" a macroscopic (permanent) shape, be manipulated and "fixed" to a temporary and dormant shape under specific conditions of temperature and stress, and then later relax to the original, stress-free, condition under thermal, electrical, or environmental command. This relaxation is associated with elastic deformation stored during prior manipulation. Shape memory materials have aroused great attention by scientists and engineers due to their capacity to remember two shapes at different conditions. This gives SMP materials great potential for sensors, actuators, and smart devices with potential for a variety of applications.

The most prominent and widely used shape memory materials currently are shape memory alloys (SMAs). Their shape memory effect comes from the existence of two stable crystal structures: the high temperature-favored austenitic phase and low temperature-favored (and "yield-able") martensitic phase. Downsides that limit their application include limited recoverable strains less than 8%, inherently high stiffness, high cost, comparatively inflexible transition temperature, and demanding processing and training conditions. Such limitations have provided motivation for the development of alternative materials, especially polymeric shape memory materials.

Polymeric materials are intrinsically capable of a shape memory effect, although the mechanisms responsible differ dramatically from those of metal alloys. In SMAs, pseudo-plastic fixing is possible through the martensitic de-twinning mechanism, while recovery is triggered by the martensite-austenite phase transition. In contrast, shape memory polymers achieve temporary strain fixing and recovery through a variety of physical means, while the underlying extensibility is derived from the intrinsic elasticity of polymeric networks.

The shape memory effect in polymers can take two quite distinct forms: one-way or two-way shape memory. In the one-way shape memory case, the cycle is started at low stress and high temperature, at which point the stress ramped to deform the sample, and following which steps of cooling under load and then unloading at low temperature reveal the quality of shape "fixing". Finally, reheating the sample to the original temperature leads to strain recovery. In contrast, two-way shape memory features reversible actuation at a single applied stress.

Additional pertinent background for the present invention is that of self-healing polymers. In fact, self-healing was a concept developed in the 1980's as a way to heal cracks that were not externally visible, in order to prolong the life of polymeric materials. Self-healing is a mechanism wherein microcracks rebond to heal the area of damage. One example of accomplishing self-healing is through macromolecular chain interdiffusion where the self-healing is triggered when the material is exposed to temperatures above its $T_m$, a common method of healing among thermoplastic semi-crystalline polymers.

Other self-healing systems incorporate microencapsulated healing agents where a propagated crack will rupture the capsule allowing the agent to fill in the damaged site by capillary action and bond the crack surfaces via in-situ polymerization. For example, some options have involved an autonomous healing polymeric composite system which integrates a ruthenium-based Grubbs' catalyst that initiates ring-opening metathesis polymerization of dicyclopentadiene (DCPD) in a thermoset matrix. Due to damage, a crack will form in the bulk of the material, rupturing a monomer-filled microcapsule and lead to flow of the monomer into the crack site by capillary action. The Grubb's catalyst particles, which are randomly distributed throughout the matrix, will trigger polymerization upon contact with the monomer, even at room temperature, causing re-bonding of the crack surfaces.

The present inventors have developed approaches to self-healing materials involving thermoset/thermoplastic blend prepared by polymerization-induced phase separation (PIPS) and exhibiting heat-induced "bleeding" that enables healing of cracks and reversible adhesion as well as shape memory assisted self-healing, referred to as SMASH. In the first approach, poly(ε-caprolactone) (PCL) was mixed as a single-phase with a particular epoxy formulation. During cure, the system undergoes polymerization-induced phase separation (PIPS) at a critical point during the epoxy polymerization. This leads to a bricks-and-mortar morphology amenable to both self-healing and reversible adhesion: as samples are heated the PCL "mortar" phase melts and then volumetrically expands, coating all surfaces. The melt-adhesive then inter-diffuses and, upon recrystallization during cooling, gains strength for repair or bonding.

In the second approach, a thermoset/thermoplastic blend, each component being of the same polymer composition (poly(ε-caprolactone), is prepared. Importantly, for self-healing to work a particular kind of shape memory—reversible plasticity shape memory (RPSM)—is required. Here, strain imparted to the sample at room temperature (apparently plastic in nature) is recovered completely with a single heating event. This recovery is driven by the cross-linked network that has elastic memory of the stress-free geometric configuration. During the same heating event, the linear polymer (approximately 50% of the material) exists in the molten state and is therefore free to diffuse to the damage site. Upon crack closure by shape memory, the crack surfaces come into molecular contact, enabling re-entanglement of the linear PCL chains. Cooling back to room temperature then re-crystallizes both forms of PCL, yielding a healed polymeric article.

These materials, however, are not structural, load-bearing materials, such as those having Young's modulus in the 1 GPa range. In addition, in many instances it is preferred that the material (or materials) be thermoplastic, and amenable to such processing methods as molding, extrusion, blown film, or other large-scale processes. Until now, this combination of properties has not been achieved.

BRIEF SUMMARY OF THE INVENTION

The present invention provides a structural shape memory assisted self-healing polymer that is formed by laminating thin layers of an ionomer and a WEGP-type SMP. Here, WEGP stands for well-entangled glassy polymer. These SMPs provide shape memory by virtue of the physical crosslinks in the form of entanglement, whereas shape fixing is afforded by vitrification of the constituent macromolecular chains at a point where they are under both stress and strain. In this embodiment, the shape memory polymer may comprise atactic poly(styrene) (PS) with molecular weight in the 200 kDa range (or alternatively poly(methyl methacrylate) (PMMA)) in combination with polycyclooctene (PCO). The ionomer may comprise a member of the poly(styrene sulfonate) (PSS) family of ionomers. The present invention may also comprise an interpenetrating, immiscible polymer network (IPN) featuring a microstructure amenable to good self-healing assisted shape memory that is based on a blend of polystyrene and polystyrene sulfonate (PSS).

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Referring now to the drawings, the present invention comprises a shape memory assisted self-healing polymer having load bearing structure. The present invention comprises several critical "ingredients" to achieve the desired effect in polymeric systems. First, reversible plasticity shape memory (RPSM) is needed to close cracks (from damage) and bring into near-molecular contact the surfaces created during crack formation. RPSM can be achieved in cross-linked (or high molecular weight) semicrystalline polymers whose Tg is below room temperature and Tm is above room temperature. It can also be achieved in crosslinked (alternatively, well-entangled) amorphous polymers whose Tg is no more than 15-20° C. above room temperature.

Second, rebondable surfaces, such as surface-to-surface rebonding, may be required for effective self-healing. Combined with RPSM (described above) that closes the crack surfaces of damage, rebonding will enable development of some strength via molecular interactions. For example, non-covalent ionic interactions and/or polymer chain entanglements may be used for rebonding. The activation temperature for rebonding will need to roughly coincide with the activation temperature for RPSM so that a single heating event can cause both crack-closure and rebonding.

Third, it is preferred that the materials remain stiff (feature high Young's modulus ~1 GPa) even during heat-triggered self-healing so that the materials can still bear some mechanical load during heating and not soften. In order that the self-healing materials meet this stiffness requirement—even during heat-triggered healing—polymers or polymer combinations that feature a glass transition temperature that exceeds room temperature are preferred.

Figure 1:
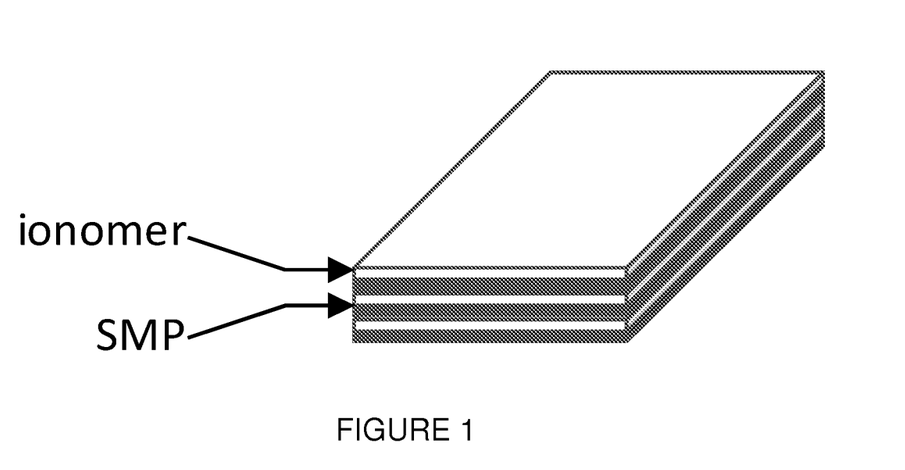
FIG. 1 is a schematic of a lamination approach to forming a structural shape memory assisted self-healing polymer according to the present invention.
Figure 3:
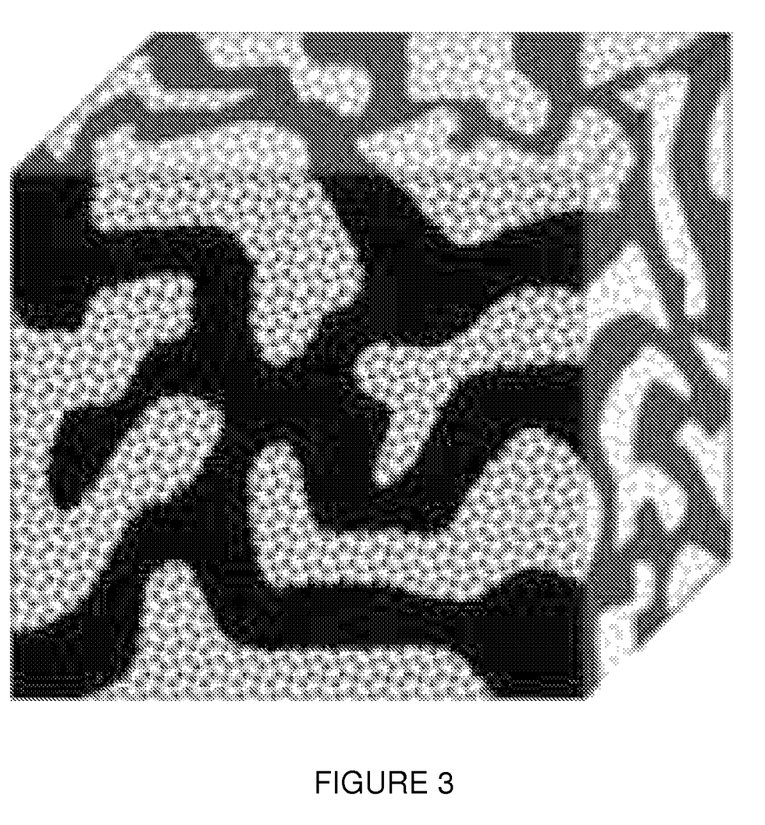
FIG. 3 is a schematic of an IPN microstructure featuring interpenetration of the WEGP-type SMP (black) and the ionomeric rebonding polymer (gray) for use with a structural shape memory assisted self-healing polymer according to the present invention

The preferred approach of the present invention involves combining an ionomer with a well-entangled glassy polymer in some form as more fully discussed below. The present invention also encompasses covalently crosslinked olefinic polymers, even though their modulus is below 1 GPa, given the RPSM behavior of such polymers. The ionomeric component offers rebonding capability, while the well-entangled glassy polymer offers RPSM shape memory. Thus, heating to a temperature within the breadth of Tg is expected to enable the combination of RPSM and rebonding events to occur nearly simultaneously. The present invention may be configured into: (i) laminated films (blending by assembly) or (ii) an interpenetrating polymer network (IPN) immiscible blend as seen in FIGS. 1 and 3, respectively.

The present invention provides a platform for systematic study of the ionomeric and SMP layers for their rebonding and RPSM characteristics, respectively. FIG. 1 shows a schematic depiction of this approach to combining an ionomer and SMP, where thin layers of ionomer and WEGP-type SMP (each ca. 100 µm) are compression molded as a "stack" 10-20 layers thick. Layers could be thinner and more numerous using microlayering extrusion technology.

The present invention may use compression molding of individual films and then the multilayer stacking; however, it is important to note the existence of multilayer extrusion technology for mass-production of such structures such as that disclosed in Mueller, C D; Nazarenko, S; Ebeling, T; Schuman, T L; Hiltner, A; Baer, E, Novel structures by microlayer coextrusion—Talc-filled PP, PC/SAN, and HDPE/LLDPE, Polym. Eng. Sci. 37 355-362 (1997), hereby incorporated by reference in its entirety.

The SMP component of the present invention should be relatively stiff, processable by conventional melt processes (molding, extrusion, etc) and feature good shape memory. One SMP that be used in lamination in accordance with the present invention is atactic poly(styrene) (PS) with molecular weight in the 200 kDa range. This polymer features good shape memory properties owing to the long relaxation time for entanglements (related to high molecular weight), rendering those entanglements as physical crosslinks. Further, the polymer features a Young's modulus in excess of 2 GPa at room temperature and a Tg near 100° C. On the downside, such a high molecular weight features a high melt viscosity, when processed at a typical processing temperature, such as 180° C. Thus, optimization of the PS component will involve balancing of shape recovery with melt viscosity. A suitable substitute for PS here is poly(methyl methacrylate) (PMMA).

Another SMP for lamination is polycyclooctene (PCO), which is semicrystalline and features a lower Young's modulus of about 0.3 GPa at room temperature. However, when crosslinked (thermally by peroxide cure or with radiation by exposure to electron beam), the SMP has excellent (near-100%) shape recovery and the uncured, precursor polymer has excellent flow characteristics. This polymer provides a model system that can help with the understanding of the combination of shape memory and rebonding with an ionomer as the molecular weight of the glassy PS-based SMP is optimized.

Other SMPs that may be used include poly(styrene-butadiene) copolymers, polynorbornene, poly(norbornene-co-cyclooctene), acrylic copolymers (poly(t-butyl acrylate-co-n-butyl acrylate)), and all class III (physically crosslinked glassy copolymers as shape-memory polymers) as described in C. Liu, H. Qin, and P. T. Mather, *J. Mater. Chem.* V17 1543-1558 (2007), hereby incorporated by reference in its entirety, including but not limited to poly(vinyl acetate), poly(vinyl acetate)/PVDF melt-miscible blend, poly(vinyl acetate)/poly(lactide) melt-miscible blend, and polyurethanes utilizing amorphous soft segments with Tg greater than room temperature, including poly(lactide) and poly(ethylene adipate) and any diisocyanate and chain extender utilized commonly in the polyurethane industry.

The ionomeric component of the present invention should feature an ability to disorder and re-order (thus allow rebonding) at a temperature near the SMP activation temperature. In this case, that should occur near the glass transition temperature (Tg) for PS or the glass transition temperature (Tm) for PCO. Fundamentally, the important temperature for healing is the temperature above which flow as a liquid (which means indefinitely under such forces as pressure, gravity, or capillary action) becomes possible, i.e., above Tg for amorphous polymers and above Tm for semicrystalline polymers. Thus, the present invention takes advantage what will be referred to as the "self-healing transition temperature" and this term shall mean the temperature at which a healing transition as described above will occur, which may be the glass transition temperature for amorphous polymers used as the healing component of the present invention, or the melting temperature for semicrystalline polymers used as the healing component of the present invention.

Figure 2:
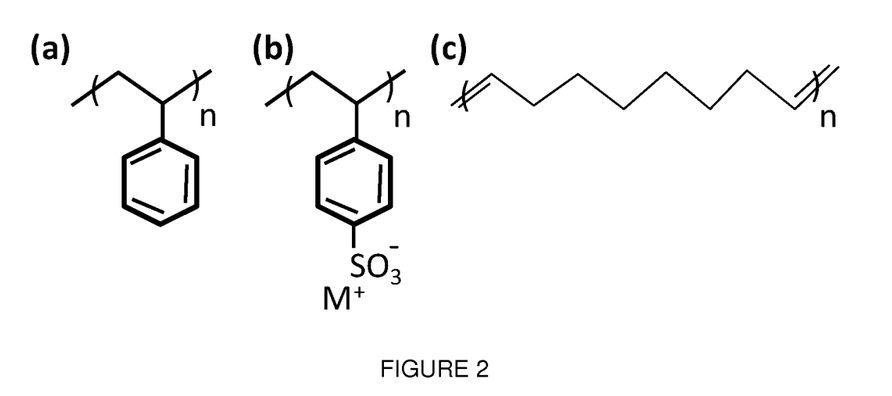
FIG. 2 is a chemical diagram of a polymer useful for the embodiments of the present invention.

For this purpose, the present invention may include the poly(styrene sulfonate) (PSS) family of ionomers, which allows for variation of sulfonation levels that will affect rebonding strength and kinetics, and the counter-anion composition, which will affect the order-disorder temperature for the ionic clusters. The polymers proposed for utilization are seen in FIG. 2. Other components that may serve as the healing element of the present invention include sulfonated polymers with the same backbone chemistry of the well-entangled glassy polymer. For example, such components may comprise partially sulfonated or completely sulfonated (hereafter "sulfonated") polystyrene, sulfonated polycyclooctene, sulfonated polynorbonene, sulfonated polynorborne, and sulfonated poly(styrene-butadiene). In addition, low-melting thermoplastic polymers capable of flowing and entangling at the damage sight and then recrystallizing during cooling may serve as the healing element, including poly(ε-caprolactone), poly(ethylene oxide), poly(ethylene glycol), poly(butylene terephthalate), poly(ethylene terephthalate), poly(ethylene-co-octene), nylon-11, nylon-12, nylon-6, and poly(ethylene adipate). In addition, glassy polymers featuring low Tg greater than room temperature and low enough molecular weight (<50,000 g/mol) to allow adequate flow during healing may serve as the healing element, including poly(n-butyl acrylate-co-methyl methacrylate), poly(t-butyl acrylate), poly(t-butyl acrylate-co-n-butyl acrylate), poly(norbornene), and poly(lactide).

Standard compression molding techniques may be used to make large area films of each SMP and ionomer (rebonding) polymers with thicknesses of ~0.1 mm. These films may be cut into smaller rectangular pieces approximately 2 cm×6 cm and made into stacks of 10-20 films for each component that are again compression molded to develop a strong bond between layers. For the case of PCO as the SMP, a final processing step of electron-beam irradiation or peroxide cure will be required. A peroxide cure may be used as the primary step here, with use of e-beam processing only if necessary.

The present invention also includes a lamination process for combining one or more layers of shape memory polymers with one or more layers of healing components as described above. First, films of PCO compounded with a small percentage (approximately 3% by weight) of peroxide-based cros slinking agent (for example, dicumyl peroxide (DCP) or benzoyl peroxide) are prepared by blending in an twin-screw extruder or by other means and compression molded or extruded into film form above the melting point of PCO and below the crosslinking temperature, for example molding at T=70° C. Separately, PCO film is prepared by compression molding or extrusion at 70° C. In both cases, the films may feature similar thicknesses ranging from about 10 microns to 1 mm. The peroxide-containing PCO films are to become the shape memory portion of the layered composite, while the pristine PCO films are to become the healing portion of the layered composite. Having prepared the films, they are stacked in alternative format with a minimum number of layers being five (5) and with no maximum number of layers beyond practical manufacturing considerations and with peroxide-containing PCO located at the outer-most (top and bottom) surfaces. Finally, the assembled stack of films is cured by heating under pressure in a mold or autoclave to a curing temperature of about 140° C. for about 30 minutes. In doing so, a good bond between layers results and excellent SMASH behavior may be witnessed. An alternative process of curing the peroxide-containing PCO films before layered assembly and molding proved unable to yield layered composites with useful adhesion between layers.

The approach of the present invention is a "brute force" approach that integrates the shape memory and rebonding functionalities in a simple, stratified manner. The simplicity of the process holds a significant advantage in terms of making progress. Furthermore, this approach allows for independent variation of each component that will allow systematic determination of the best SMP and rebonding combinations. It will also reveal any synergistic compositions. As a disadvantage, the approach will be limited in form primarily to self-healing films; however, it may be possible to pelletize a micro-layered extrudate to yield a molding resin with self-healing characteristics.

In an alternative embodiment, the present invention comprises an interpenetrating, immiscible polymer network to create a self-healing polymer that utilizes a microstructure that provides similar functionality to the inventor's prior work with epoxy/PCL blends, but in connection with thermoplastics. A schematic of an IPN microstructure featuring interpenetration of a WEGP-type SMP (black) and an ionomeric rebonding polymer (gray) is shown in FIG. 3. This embodiment involves the use of a polymer blend that can form such a structure, with one component serving as a WEGP-type SMP and the other serves as the ionomeric rebonding component. Further, the desired phase behavior would be of the upper-critical solution temperature (UCST) type, where in the two-phase, IPN microstructure would form upon cooling (not upon heating, as is the case for LCST blends) after extrusion or molding. Blends of polystyrene and polystyrene sulfonate (PSS) feature offer such UCST phase-separation behavior. The preparation of IPN microstructure featuring interpenetration of a WEGP-type SMP and an ionomeric rebonding polymer may be accomplished by electrospinning the SMP to create nanosize fibers and molding into the healing agent by compression molding. Alternatively, the preparation could be prepared by electrospinning both the SMP and the SH polymer at the same time to create an interpenetrating network.

The present invention may use PS/PSS blends of the type reported by Winey (2007), hereby incorporated by reference in its entirety. Values for the sulfonation level and weight percentage of PSS incorporated may be selected so as to include three (3) levels of each for initial evaluation of properties, including thermal, mechanical, and microstructure. From among those nine (9) samples, three may be selected for more detailed analysis of tensile testing and self-healing.

Polymer processing using a blend process may be employed to avoid lamination. A combination of solvent-casting (small-scale blending), extrusion (Randcastle; 50 gram scale), and compression molding may be used to prepare films. The IPN morphology will be achieved and examined by passing above the UCST (measured using rheology and differential scanning calorimetry, DSC; see below) to the single-phase region and then cooling into the two phase region and annealing. The annealing will proceed until the microstructure stops coarsening, as inspected with scanning electron microscopy (SEM), transmission electron microscopy (TEM), and small-angle x-ray scattering (SAXS) measurements.

The IPN approach of the present invention, while having more compositional variables, is attractive from the standpoint of processing. Indeed, this approach is quite amenable to the creation of a molding resin in pellet form that could be used by molding companies to manufacture self-healing, structural plastics. A disadvantage relative to the lamination approach appears at the research level since the shape memory and rebonding properties will be convoluted and may be challenging to decouple.

For each group of shape memory polymers synthesized, the following characterization tests may be conducted, which will confirm the structures synthesized while also forecasting the expected shape memory properties to be characterized later on a subset of materials synthesized. Gel Permeation Chromatography (GPC) may be used to measure the molecular weights (Mn and Mw) of the polymers synthesized. As Mw is strongly correlated with strength and durability of a polymer, while also increasing viscosity, this test may be used to optimize the molecular weight of polymers selected.

Thermal analysis based on differential scanning calorimetry (DSC) may be used to measure the melting transitions and glass transitions of the selected polymers, adjusting composition as needed to fine tune the Tg (or Tm) of the SMP. Further, DSC may be used to ascertain, in conjunction with SAXS and rheology, the phase separation of PS and PSS.

X-ray diffraction analysis may be used to characterize selected polymer systems and to measure the degree of crystallinity for crystalline phases within each material using wide-angle x-ray diffraction and associated standard methods. X-ray diffraction will be helpful in comparing degrees of crystallinity, degrees of orientation, and crystallization kinetics (complementing DSC) for those samples that are strong candidates for the present invention but for which there exists a need to fine-tune crystallization behavior. SAXS studies with the same instrument will be helpful in ascertaining the nature of the ionomeric associations pertinent to rebonding.

TEM may be used to evaluate laminate and blend microstructures. Samples can be microtomed (or cryo-microtomed, if necessary) and then evaluated using TEM equipment (such as the Delong LVEM-5 instrument) to see the length scale and degree of phase separation in the materials for correlation with self-healing performance.

Melt rheology may be performed, such as with a TA Instruments AR-G2 melt rheometer in a steady shearing mode, to study the flow characteristics of individual components and blends pertinent to processing. Furthermore, the AR-G2 may be used in an oscillatory mode to ascertain the linear viscoelastic properties during cooling through the UCST phase boundary, confirming the results of Winey as applied to the present invention. Such results may be corroborated with SAXS results.

Dynamic Mechanical Analysis (DMA) may be used to determine the stiffness of the laminates and blends as a function of temperature, such as by using a Q-800 DMA (TA Instruments).

Tensile testing may be used to determine the durability of the polymers and may be assessed using ultimate tensile testing such as with a Linkam TST-350 apparatus. Thus, for each composition, it is possible to measure the Young's modulus, yield stress, elongation at break, and engineering toughness. Those materials made in accordance with the present invention that combine good reversible actuation with high toughness will be highly ranked from among the candidates for transition to further development.

Figure 4:
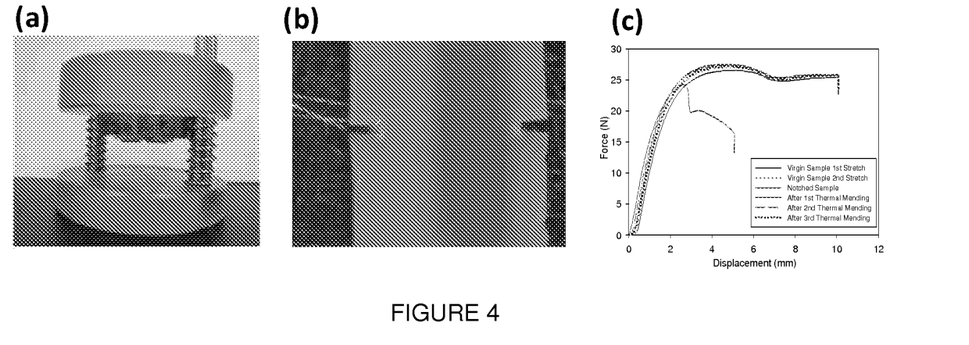
FIG. 4 is a series of photographs and a graph illustrating characterization tests for a structural shape memory assisted self-healing polymer according to the present invention.

The present invention may also be evaluating using self-healing characterization tests on materials produced using both approaches. In this testing, deeply double-edge notched (DDEN) test specimens that feature two opposing cracks may be used to simulated damage, as seen in FIG. 4. More specifically, self-healing testing wherein film specimens are prepared with a custom deeply double-edge notched (DDEN) punch (a) to yield specimens of the type shown in (b). Testing will involve tensile loading to incomplete failure (c; blue line) and recovery of mechanical properties (c; red lines). Importantly, the healing temperature may be varied for comparison with the material stiffness as ascertained with DMA. The trade-off (if any) may be quantfied between extent of healing and stiffness during healing, noting that stiffness is preferably to be maintained during healing. Rebonding and RPSM may be evaluated separately if necessary; however, if initial self-healing experiments reveal excellent performance, this separate testing will be obviated.

Example 1

Figure 5:
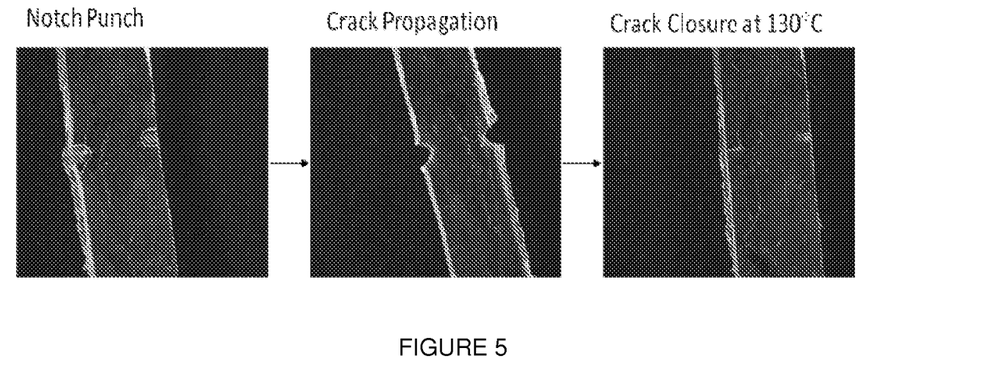
FIG. 5 is a series of photographs illustrating crack closure in an embodiment of the present invention.

As described above, the SMP component can comprise polystyrene. Polystyrene having a molecular weight of 283 kDa and a glass transition temperature of 106.2 degrees C. was formed into a strip and tested for crack closure by punching notches in the strip, stretching to propagate the cracks, and then heated to initiate crack closure at 130 degrees C. As seen in FIG. 5, polystyrene was capable of restoring its original shape after physical damage. The composition had a storage modulus higher than 1 GPa at room temperature.

Example 2

Figure 6:
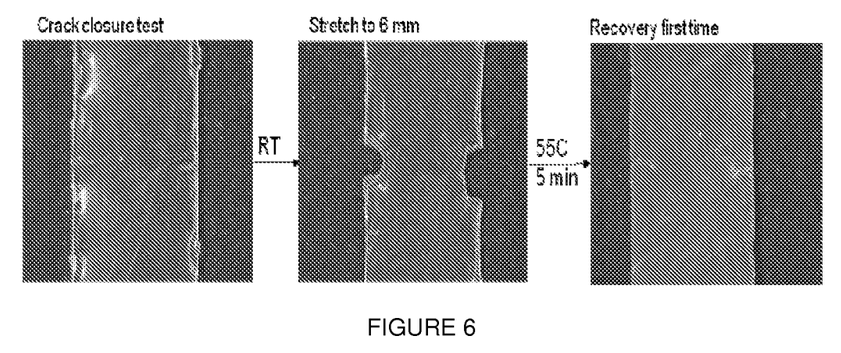
FIG. 6 is a series of photographs illustrating crack closure in another embodiment of the present invention.

Poly(styrene-butadiene) having a molecular weight from 620 to 830 KDa and a glass transition temperature between 25 and 39 degrees C. was tested as set forth in Example 1. As seen FIG. 6 poly(styrene-butadiene) was capable of restoring its original shape after physical damage. The composition had a storage modulus around than 1 GPa at room temperature.

Example 3

Figure 7:
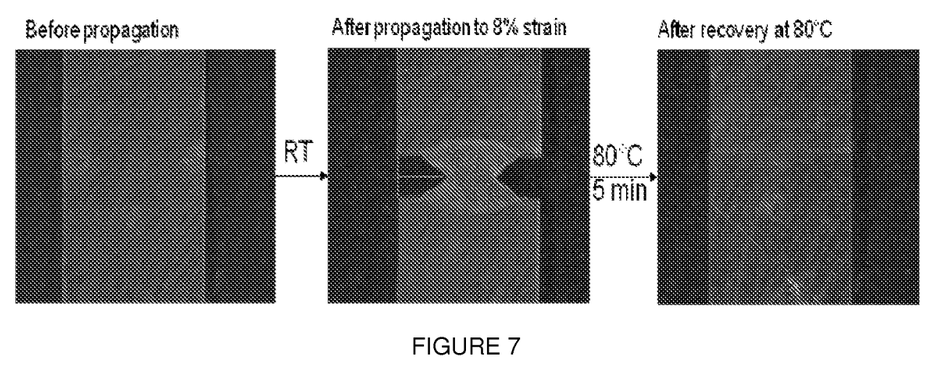
FIG. 7 is a series of photographs illustrating crack closure in an additional embodiment of the present invention.

Polynorbornene having a molecular weight from 340 to 411 KDa and a glass transition temperature between 55 and 57 degrees C. was tested as set forth in Example 1. As seen FIG. 7, polynorbornene was capable of restoring its original shape after physical damage. The composition had a storage modulus close to 1 GPa at room temperature.

Example 4

Figure 8:
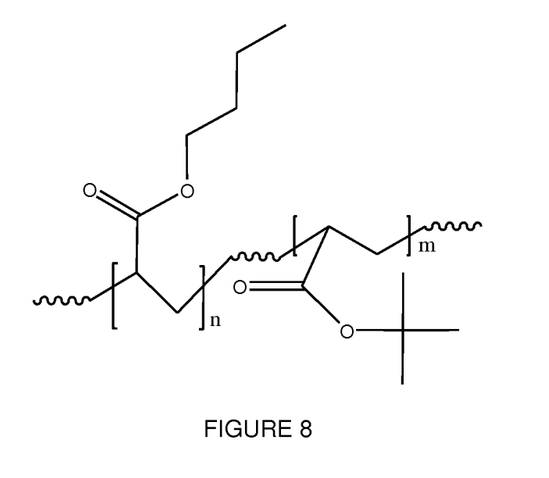
FIG. 8 is a schematic of a polymer for use with the present invention.
Figure 9:
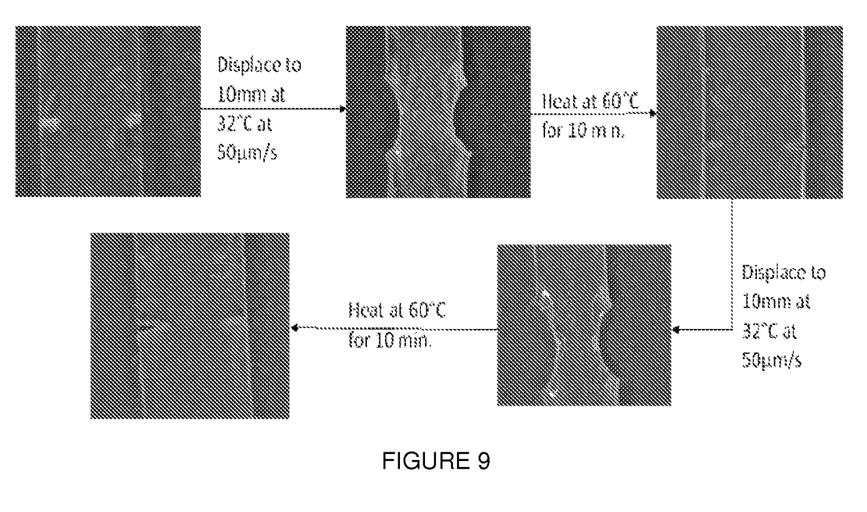
FIG. 9 is a series of photographs illustrating crack closure in an embodiment of the present invention that includes the polymer of FIG. 8.

Poly(tBa-BA), as seen in FIG. 8, having a molecular weight of 236 KDa and a glass transition temperature of 38.5 degrees C. was tested as set forth in Example 1. As seen FIG. 9, poly(tBa-BA) was capable of restoring its original shape after physical damage. The composition had a storage modulus close to 1 GPa at room temperature.

Example 5

Figure 10:
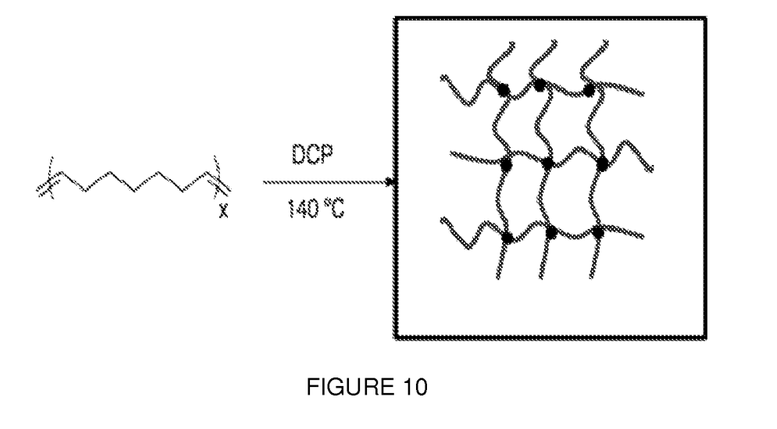
FIG. 10 is a schematic of another polymer for use with the present invention.
Figure 11:
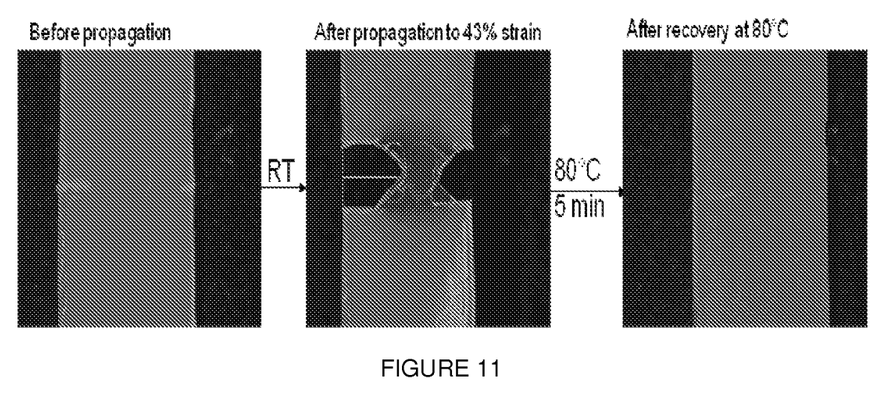
FIG. 11 is a series of photographs illustrating crack closure in an embodiment of the present invention that includes the polymer of FIG. 10.

Crosslinked polycyclooctene (PCO), as seen in FIG. 10, having a molecular weight of 90 KDa and a melting point of between 50 and 53 degrees C. was tested as set forth in Example 1. As seen FIG. 11, crosslinked polycyclooctene was capable of restoring its original shape after physical damage. The composition had a storage modulus close to 100 MPa at room temperature and up to 600 MPa at −60 degrees C.

What is claimed is:

1. A self-healing system, comprising:
   a structural layer consisting of a shape-memory polymer film selected from the group consisting of poly(styrene), poly(styrene-butadiene), poly(norbornene), poly(norbornene-cyclooctene), poly(tert-butyl acrylate-butyl acrylate), and crosslinked poly(cyclooctene) and having a glass transition temperature; and
   a heat-triggered self-healing layer consisting of a ionomeric polymer film having a self-healing temperature within 20° C. of said glass transition temperature of said shape-memory polymer film that is adjacent to and bonded to said structural layer.

2. The system of claim 1, wherein said ionomeric polymer is selected from the group consisting of poly(ε-caprolactone), poly(ethylene oxide), poly(ethylene glycol), poly(butylene terephthalate), poly(ethylene terephthalate), poly(ethylene-co-octene), nylon-11, nylon-12, nylon-6, poly(ethylene adipate), poly(n-butyl acrylate-co-methyl methacrylate), poly(t-butyl acrylate), poly(t-butyl acrylate co-n-butyl acrylate), poly(norbornene), poly(lactide), and glassy polymers having a glass transition temperature greater than room temperature and a molecular weight below 50,000 g/mol.

3. The system of claim 1, further comprising a plurality of said structural layers alternating with a corresponding plurality of said heat-triggered self-healing layers.

* * * * *